United States Patent
Hong et al.

(10) Patent No.: US 10,316,109 B2
(45) Date of Patent: Jun. 11, 2019

(54) THERMOPLASTIC RESIN AND THERMOPLASTIC RESIN COMPOSITION INCLUDING THE SAME

(71) Applicant: LG CHEM, LTD., Seoul (KR)

(72) Inventors: Sung Won Hong, Daejeon (KR); Hyung Sub Lee, Daejeon (KR); Min Cheol Ju, Daejeon (KR); Min Seung Shin, Daejeon (KR); In Soo Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 32 days.

(21) Appl. No.: 15/528,487

(22) PCT Filed: Aug. 31, 2016

(86) PCT No.: PCT/KR2016/009730
§ 371 (c)(1),
(2) Date: May 19, 2017

(87) PCT Pub. No.: WO2017/039322
PCT Pub. Date: Mar. 9, 2017

(65) Prior Publication Data
US 2017/0260300 A1    Sep. 14, 2017

(30) Foreign Application Priority Data
Aug. 31, 2015   (KR) .................. 10-2015-0122579

(51) Int. Cl.
*C08K 3/34*  (2006.01)
*C08C 1/15*  (2006.01)
*C08L 13/02* (2006.01)
*C08F 212/12* (2006.01)
*C08F 6/22*  (2006.01)
*C08L 25/16* (2006.01)

(52) U.S. Cl.
CPC .............. *C08C 1/15* (2013.01); *C08F 6/22* (2013.01); *C08F 212/12* (2013.01); *C08K 3/34* (2013.01); *C08L 13/02* (2013.01); *C08L 25/16* (2013.01)

(58) Field of Classification Search
CPC . C08C 1/15; C08F 6/22; C08F 212/12; C08K 3/34; C08L 9/02; C08L 9/08; C08L 13/02; C08L 25/04; C08L 25/16
See application file for complete search history.

(56) References Cited

U.S. PATENT DOCUMENTS

| 2,429,439 | A | 10/1947 | Westfahl et al. |
| 4,639,473 | A | 1/1987 | Wingler et al. |
| 5,883,189 | A | 3/1999 | Eichenauer et al. |
| 2006/0142455 | A1 | 6/2006 | Agarwal et al. |
| 2012/0322924 | A1 | 12/2012 | Arigo et al. |
| 2014/0206800 | A1* | 7/2014 | Wu .................... C08L 69/00 524/127 |

FOREIGN PATENT DOCUMENTS

| CN | 1303410 A | 7/2001 |
| CN | 1760254 A | 4/2006 |
| CN | 103582673 A | 2/2014 |
| JP | 5763313 A | 4/1982 |
| KR | 10-2010-0034340 A | 4/2010 |
| KR | 20100034340 * | 4/2010 |
| KR | 10-2010-0090705 A | 8/2010 |
| KR | 1020150037460 A | 4/2015 |
| KR | 10-2015-0072095 A | 6/2015 |
| KR | 1020150060133 A | 6/2015 |
| WO | WO 2015/069380 A2 | 5/2015 |

OTHER PUBLICATIONS

Machine translation of KR 2010-0034340 original date (2010).*
International Search Report for PCT/KR2016/009730 filed Aug. 31, 2016.
Extended European Search Report for Ep Application No. 16842288.9 dated Apr. 24, 2018.
Chinese Office Action for Application No. 2016800038307, dated Mar. 4, 2019.

* cited by examiner

Primary Examiner — Edward J Cain

(57) ABSTRACT

The present invention relates to a thermoplastic resin. In accordance with the present invention, a thermoplastic resin exhibiting superior heat resistance, gloss, and whiteness while having mechanical properties identical to or higher than those of a conventional thermoplastic resin and a thermoplastic resin composition including the same are provided.

20 Claims, 1 Drawing Sheet

THERMOPLASTIC RESIN AND THERMOPLASTIC RESIN COMPOSITION INCLUDING THE SAME

CROSS-REFERENCE TO RELATED APPLICATION(S)

This application is a U.S. National Stage of PCT/KR2016/009730, filed Aug. 31, 2016, which claims the priority benefit of Korean Patent Application No. 10-2015-0122579, filed on Aug. 31, 2015 in the Korean Intellectual Property Office, the disclosures of which are incorporated herein by reference.

TECHNICAL FIELD

The present invention relates to a thermoplastic resin, more particularly to a thermoplastic resin exhibiting superior heat resistance, gloss, and whiteness while having mechanical properties identical to or higher than those of a conventional thermoplastic resin and a thermoplastic resin composition including the same.

BACKGROUND ART

In general, acrylonitrile-butadiene-styrene (ABS) copolymer resins have superior processability and excellent appearance characteristics due to inclusion of styrene, rigidity and chemical resistance due to inclusion of acrylonitrile, and impact resistance of butadiene rubber. Accordingly, acrylonitrile-butadiene-styrene (ABS) copolymer resins are used in various fields such as automobile interior materials, housings for household appliances, and toys. In particular, since automobile interior materials are often exposed to high temperatures, superior thermal resistance, e.g., heat deflection temperature (HDT), is required.

To produce acrylonitrile-butadiene-styrene copolymer resin satisfying such high thermal resistance, a method of melt-mixing an α-methyl styrene-acrylonitrile copolymer (AMSAN), which is prepared through emulsion polymerization or solution polymerization and has a high glass transition temperature (Tg), with a rubber-reinforced graft copolymer (ABS copolymer), which is prepared through emulsion polymerization, while controlling the content of rubber within a predetermined range has been suggested.

Such an α-methyl styrene-acrylonitrile copolymer is generally prepared by copolymerizing an α-methyl styrene monomer with a vinyl cyanide compound monomer through emulsion polymerization. However, the α-methyl styrene monomer has drawbacks such as low reactivity and polymerization stability. When the content of α-methyl styrene is increased to overcome such disadvantages, a polymerization conversion rate is decreased, and thus, productively is decreased. In addition, problems such as depolymerization and oligomer generation may occur depending upon a temperature condition during polymerization, whereby heat resistance may be decreased.

RELATED ART DOCUMENT

Patent Document (Patent Document 1) US2012-0322924 A1

DISCLOSURE

Technical Problem

Therefore, the present invention has been made in view of the above problems, and it is one object of the present invention to provide a thermoplastic resin exhibiting superior heat resistance, gloss, and whiteness while having mechanical properties identical to or higher than those of a conventional thermoplastic resin.

It is another object of the present invention to provide a thermoplastic resin composition including the thermoplastic resin.

The above and other objects can be accomplished by the present disclosure described below.

Technical Solution

In accordance with one aspect of the present invention, provided is a thermoplastic resin including an α-methyl styrene-vinyl cyan compound copolymer and a compound represented by Formula 1 below:

$$A_o(Si_nO_{2n+1})_p, \quad \text{[Formula 1]}$$

wherein A is a divalent or trivalent metal, n is an integer of 1 to 100, and each of o and p is an integer of 1 to 5.

In accordance with another aspect of the present invention, provided is a thermoplastic resin composition that includes the thermoplastic resin and a vinyl cyan compound-conjugated diene based compound-vinyl aromatic compound copolymer resin.

Advantageous Effects

As apparent from the fore-going, the present invention advantageously provides a thermoplastic resin exhibiting superior heat resistance, gloss, and whiteness while having mechanical properties identical to or higher than those of a conventional thermoplastic resin.

In addition, in accordance with the present invention, a thermoplastic resin composition including the thermoplastic resin is provided.

BEST MODE

Figure 1:
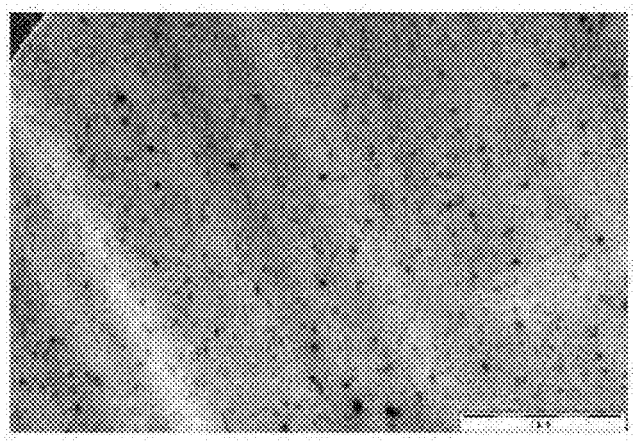
FIGS. 1 to 3 respectively illustrate transmission electron microscopic (TEM) images of surfaces of specimens, which are prepared according to Examples 2 and 4 and Comparative Example 3, photographed at ×50K magnification. Here, a powder-type sample (resin powder before extrusion) was prepared into a film-type specimen at 220° C., and then TEM analysis was performed. TEM (Jeol, JEM-1400) was used as an analytical instrument. Analysis conditions were as follows: Acc. volt: 120 KV, spot size: 1. The sample was subjected to trimming and sectioning (RT), and then observed.

Hereinafter, the present invention is described in detail.

The present inventors confirmed that, when a water-soluble silicate compound is added during coagulation of an α-methyl styrene-vinyl cyan compound copolymer latex with a metal salt coagulant, heat resistance of a resin is improved and superior whiteness, gloss, and the like are exhibited, although the soluble silicate compound is used in a small amount, thus completing the present invention.

Hereinafter, the thermoplastic resin of the present invention is described in detail.

The thermoplastic resin includes an α-methyl styrene-vinyl cyan compound copolymer and a compound represented by Formula 1 below:

$$A_o(Si_nO_{2n+1})_p \quad \text{[Formula 1]}$$

wherein A is a divalent or trivalent metal, n is an integer of 1 to 100, and each of o and p is an integer of 1 to 5.

n may be, for example, an integer of 1 to 50, or an integer of 1 to 20.

o may be, for example, 1 or 2, and p may be, for example, 1 or 3.

The compound represented by Formula 1 may be, for example, an in-situ compound generated by reacting a water-soluble silicate compound and a metal salt coagulant in the α-methyl styrene-vinyl cyan compound copolymer. In this case, the formed compound represented by Formula 1 is uniformly dispersed in a resin, and thus, an effect of shielding heat conduction is exhibited, whereby heat resistance is increased.

Preferably, the thermoplastic resin of the present invention may be prepared through an aging process at high temperature under pressure. In this case, particles of ingredients are re-assembled with each other and particle sizes increase. Accordingly, the thermoplastic resin exhibits superior heat resistance, whiteness, and thermal conductivity shielding property.

The aging process at high temperature under pressure may be carried out, for example, at 110° C. or more and 0.15 MPa or more, preferably 110 to 130° C. and 0.15 to 0.3 MPa, more preferably 120 to 130° C., under a pressure of 0.22 to 0.25 MPa for 5 minutes or more, 10 minutes or more, or 10 minutes to 30 minutes. Within this range, ingredient particles are re-assembled and particle sizes increase, whereby the thermoplastic resin exhibits superior heat resistance, whiteness, and thermal conductivity shielding property.

The compound represented by Formula 1 may have a solubility in water of, for example, 0.001 to 0.1%, 0.005 to 0.05%, or 0.005 to 0.02%. Within this range, superior heat resistance is exhibited.

The water refers to common water having a density of 1 g/ml at 4° C., and the solubility refers to percentage by weight (g) of the compound represented by Formula 1 that is dissolved in 100 ml of water at room temperature (20 to 26° C.).

Reaction between the water-soluble silicate compound and the metal salt coagulant refers to a reaction represented by Reaction Formula 1 below:

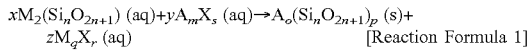

[Reaction Formula 1]

wherein M is an alkali metal, n is an integer of 1 to 100, A is a divalent or trivalent metal, X is a halogen element or a sulfate ion, and each of m, o, p, q, r, s, x, y, and z is an integer of 1 to 5.

n may be, for example, an integer of 1 to 50, or an integer of 1 to 20.

m may be, for example, 1 or 2, and s may be, for example, an integer of 1 to 3.

x may be, for example, 1 or 2, y may be, for example, 1 or 3, and z may be, for example, an integer of 1 to 3.

Each of o, q, and r may be, for example, 1 or 2, and p may be, for example, 1 or 3.

The reaction temperature may be, for example, greater than 80° C., 85 to 120° C., 90 to 110° C., 90 to 105° C., or 95 to 100° C. Within this range, substitution reaction uniformly and stably occurs.

The reaction pressure may be, for example, 0.9 to 1.1 bar or atmospheric pressure. Within this range, substitution reaction uniformly and stably occurs.

The reaction time may be, for example, 5 minutes or more, 10 minutes or more, 5 minutes to 1 hour, or 10 minutes to 30 minutes. Within this range, substitution reaction uniformly and stably occurs.

The compound represented by Formula 1 may be, for example, $ASiO_3$, and the $ASiO_3$ may be converted into $A_3SiO_5$ in the presence of water ($H_2O$). Finally, A-S—H (AO—$SiO_2$—$H_2O$) may present in a resin as represented by Reaction Formula 2 below. In this case, superior heat resistance is exhibited:

[Reaction Formula 2]

wherein A is a divalent metal.

The compound represented by Formula 1 may be included in an amount of, for example, 0.0001 to 2 parts by weight, 0.001 to 2 parts by weight, 0.01 to 2 parts by weight, 0.5 to 1.5 parts by weight, or 0.5 to 1 part by weight based on 100 parts by weight of the α-methyl styrene-vinyl cyan compound copolymer. Within this range, superior mechanical properties, heat resistance, gloss, and whiteness are exhibited.

The content of the compound represented by Formula 1 may be measured directly from the thermoplastic resin of the present disclosure through a general analytical method such as chromatography, spectroscopy, or the like or indirectly by converting an addition amount of a start material, a water-soluble silicate compound.

The α-methyl styrene-vinyl cyan compound copolymer may be prepared by, for example, copolymerizing α-methyl styrene, an aromatic vinyl compound (except for α-methyl styrene), and a vinyl cyan compound.

The α-methyl styrene may be included in an amount of, for example, 45 to 80% by weight, 50 to 80% by weight, or 60 to 80% by weight with respect to the α-methyl styrene-vinyl cyan compound copolymer. Within this range, superior heat resistance is exhibited.

The aromatic vinyl compound may be, for example, one or more selected from the group consisting of styrene, p-methyl styrene, o-ethyl styrene, p-ethyl styrene, vinyl toluene, and derivatives thereof.

The aromatic vinyl compound may be included in an amount of, for example, 1 to 15% by weight, or 2 to 10% by weight with respect to the α-methyl styrene-vinyl cyan compound copolymer. Within this range, superior mechanical properties and property balance are exhibited.

The vinyl cyan compound may be, for example, one or more selected from the group consisting of acrylonitrile, methacrylonitrile, ethacrylonitrile, and derivatives thereof.

The vinyl cyan compound may be included in an amount of, for example, 15 to 50% by weight, 15 to 45% by weight, or 15 to 35% by weight. Within this range, superior mechanical properties are exhibited.

The α-methyl styrene-vinyl cyan compound copolymer may be copolymerized, for example, through emulsion polymerization.

The emulsion polymerization may be, for example, a batch process, a semi-batch process, or a continuous process.

In the emulsion polymerization, for example, an emulsifier, an electrolyte, a polymerization initiator, a reactive initiator, and a molecular weight regulator may be further included.

The water-soluble silicate compound refers to a silicate compound that may be dissolved in water and may be present in aqueous solution state.

The water-soluble silicate compound refers to a compound having a solubility in water of 10 to 90%, 10 to 70%, or 10 to 50%.

The water is general water having a density of 1 g/ml at 4° C., and the solubility refers to percentage by weight (g) of a water-soluble silicate compound dissolved in 100 ml of water at room temperature (20 to 26° C.).

The water-soluble silicate compound may be, for example, a linear silicate compound represented by Formula 2 below:

$$M_2(Si_nO_{2n+1})$$ [Formula 2]

wherein M is an alkali metal and n is an integer of 1 to 100.

N may be, for example, an integer of 1 to 50, or an integer of 1 to 20.

The water-soluble silicate compound may be, for example, sodium silicate ($Na_2SiO_3$) or potassium silicate ($K_2SiO_3$).

The water-soluble silicate compound may be included in an amount of, for example, 0.01 to 20 parts by weight, 0.05 to 2 parts by weight, 0.05 to 1.5 parts by weight, or 0.05 to 01 parts by weight based on 100 parts by weight of the α-methyl styrene-vinyl cyan compound copolymer. Within this range, superior heat resistance and mechanical properties are exhibited.

The metal salt coagulant may be, for example, a metal salt coagulant represented by Formula 3 below:

$$A_mX_s$$ [Formula 3]

wherein A is a divalent or trivalent metal, X is a halogen element or a sulfate ion, m is an integer of 1 to 5, and s is an integer of 1 to 5.

m may be, for example, 1 or 2, and s may be, for example, an integer of 1 to 3.

The metal salt coagulant may be, for example, one or more selected from the group consisting of calcium chloride, magnesium sulfate, and aluminum sulfate.

The metal salt coagulant may be included in an amount of, for example, 0.01 to 20 parts by weight, 2 to 5 parts by weight, or 3 to 4 parts by weight based on 100 parts by weight of the α-methyl styrene-vinyl cyan compound copolymer. Within this range, superior heat resistance is exhibited.

The thermoplastic resin composition according to the present invention includes the thermoplastic resin and a vinyl cyan compound-conjugated diene based compound-vinyl aromatic compound copolymer resin.

The vinyl cyan compound may be, for example, one or more selected from the group consisting of acrylonitrile, methacrylonitrile, ethacrylonitrile, and derivatives thereof.

The conjugated diene based compound may be, for example, one or more selected from the group consisting of 1,3-butadiene, 2,3-dimethyl-1,3-butadiene, 2-ethyl-1,3-butadiene, 1,3-pentadiene, isoprene, and derivatives thereof.

The vinyl aromatic compound may be, for example, one or more selected from the group consisting of styrene, α-methyl styrene, p-methyl styrene, o-methyl styrene, p-ethyl styrene, vinyl toluene, and derivatives thereof.

The vinyl cyan compound-a conjugated diene based compound-vinyl aromatic compound copolymer resin may be a graft copolymer resin prepared though emulsion polymerization.

The vinyl cyan compound-conjugated diene-based compound-an aromatic vinyl compound copolymer resin may include, for example, 5 to 25% by weight or 5 to 15% by weight of a vinyl cyan compound, 40 to 70% by weight or 50 to 70% by weight of a conjugated diene-based compound, and 20 to 40% by weight or 15 to 35% by weight of an aromatic vinyl compound. Within this range, superior mechanical strength is exhibited.

The thermoplastic resin may be included in an amount of, for example, 50 to 90% by weight, 60 to 85% by weight, or 70 to 80% by weight with respect to the thermoplastic resin composition. Within this range, superior heat resistance, gloss, and whiteness are exhibited.

The vinyl cyan compound-conjugated diene based compound-vinyl aromatic compound copolymer resin may be included in an amount of, for example, 10 to 50% by weight, 15 to 40% by weight, or 20 to 30% by weight with respect to the heat-resistance thermoplastic resin composition. Within this range, superior mechanical properties, gloss, and whiteness are exhibited.

The thermoplastic resin composition may have a glass transition temperature (Tg), for example, 128.5° C. or more, 128.5 to 140° C., or 129 to 135° C.

The thermoplastic resin composition may have a heat deflection temperature (HDT), for example, 101.3° C. or more, 101.3 to 120° C., or 101.5 to 110° C.

The thermoplastic resin composition may have a gloss, for example, 89.5 or more, 89.5 to 99, or 90 to 95.

The thermoplastic resin composition may have, for example, a whiteness (WI) of 28 or more, 28 to 50, or 29 to 40.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLES

Example 1

140 parts by weight of ion exchange water, 70 parts by weight of α-methyl styrene as a monomer, 5 parts by weight of styrene, 1.0 part by weight of alkenyl alkanoic potassium salt as a reactive emulsifier, 0.5 parts by weight of oleic acid potassium salt, 15 parts by weight of acrylonitrile, 0.1 parts by weight of sodium phosphate($Na_3PO_4$) as an electrolyte, 0.3 parts by weight of tert-dodecylmercaptan (TDDM) as a molecular weight regulator, 0.05 parts by weight of tert-butyl hydroperoxide and 0.025 parts by weight of dextrose as fat-soluble polymerization initiators, 0.05 parts by weight of sodium pyrophosphate, and 0.0005 parts by weight of ferrous sulfate were fed batchwise into a polymerization reactor filled with nitrogen, and first polymerization was performed at a reaction temperature of 50° C. until a polymerization conversion rate reached 40% Subsequently, 25 parts by weight of ion exchange water, 10 parts by weight of acrylonitrile, 0.2 parts by weight of oleic acid potassium salt, and 0.12 parts by weight of potassium persulfate, as a reactive initiator (ini-surfactant), for increasing stability at middle and late stages of reaction and increasing a conversion rate were fed in an emulsified state into the polymerization reactor and second polymerization was performed. Temperature was elevated up to 80° C., and then reaction was terminated when a polymerization conversion rate reached to 90%. As a result, an AMSAN copolymer latex was prepared.

0.05 parts by weight of sodium silicate ($Na_2SiO_3$) (based on solid content, 1% by weight aqueous solution) was added to 100 parts by weight of the prepared emulsion polymerization copolymer latex (based on solid content) and stirring was performed. 3 parts by weight of calcium chloride as a metal salt coagulant was added to the stirred mixture, and coagulation was performed at 85 to 95° C. for 10 minutes under atmospheric pressure (normal pressure).

The coagulated emulsion polymerization copolymer latex slurry was pressurized at 0.15 to 0.25 MPa and aged at 110 to 130° C. for 10 minutes.

Subsequently, the aged emulsion polymerization copolymer latex slurry was dehydrated and dried at 98° C. for 300 seconds. As a result, an AMSAN copolymer resin powder was obtained. 77 parts by weight of the obtained AMSAN copolymer resin powder was mixed with 23 parts by weight of a conventional acrylonitrile-butadiene-styrene (ABS) resin powder (product name: DP271, manufactured by LG Chemistry) in a general mixer. A resultant mixture was melted and kneaded at 240° C. by means of a twin-screw extruder, thereby preparing a pellet-type resin composition. The prepared pellet-type resin composition was injection-molded by means of an injection molding machine and prepared into a specimen for measuring properties.

Example 2

An experiment was carried out in the same manner as in Example 1, except that sodium silicate ($Na_2SiO_3$) was added in an amount of 0.1 parts by weight (based on solid content, 1% by weight of aqueous solution).

Example 3

An experiment was carried out in the same manner as in Example 1, except that sodium silicate ($Na_2SiO_3$) was added in an amount of 0.2 parts by weight (based on solid content, 1% by weight of aqueous solution).

Example 4

An experiment was carried out in the same manner as in Example 1, except that sodium silicate ($Na_2SiO_3$) was added in an amount of 0.5 parts by weight (based on solid content, 1% by weight of aqueous solution).

Example 5

An experiment was carried out in the same manner as in Example 1, except that sodium silicate ($Na_2SiO_3$) was added in an amount of 1 part by weight (based on solid content, 1% by weight of aqueous solution).

Example 6

An experiment was carried out in the same manner as in Example 1, except that sodium silicate ($Na_2SiO_3$) was added in an amount of 1.5 parts by weight (based on solid content, 1% by weight of aqueous solution).

Example 7

An experiment was carried out in the same manner as in Example 1, except that potassium silicate ($K_2SiO_3$), instead of sodium silicate ($Na_2SiO_3$), was added in an amount of 0.5 parts by weight (based on solid content, 1% by weight of aqueous solution).

Comparative Example 1

An experiment was carried out in the same manner as in Example 1, except that 0.5 parts by weight of potassium persulfate was added instead of 0.05 parts by weight of sodium silicate ($Na_2SiO_3$).

Comparative Example 2

An experiment was carried out in the same manner as in Example 1, except that 0.8 parts by weight of α-methyl styrene was added instead of 0.05 parts by weight of sodium silicate ($Na_2SiO_3$).

Comparative Example 3

An experiment was carried out in the same manner as in Example 1, except that sodium silicate ($Na_2SiO_3$) was not added.

Comparative Example 4

An experiment was carried out in the same manner as in Comparative Example 3, except that, after agglomerating a latex, the latex was directly dehydrated and dried without being aging.

Comparative Example 5

A latex copolymer slurry was prepared by performing emulsion polymerization, coagulation, and aging processes in the same manner as in Example 1, except that the coagulation was performed at 70 to 80° C. and the aging process was performed at 80 to 90° C. However, a copolymer latex slurry obtained after aging had a high moisture content rate identical to that of a copolymer latex slurry obtained after coagulation, and thus, even after subsequent dehydration and drying processes, the copolymer latex slurry was obtained in a lump shape instead of a powder shape. Accordingly, it was difficult to perform mixing and extrusion processes. As a result, a final specimen was not obtained.

TEST EXAMPLES

The properties of the heat-resistant thermoplastic resin composition specimens obtained according to Examples 1 to 7 and Comparative Examples 1 to 4 were measured according to the following methods. Results are summarized in Tables 1 and 2 below.

Measurement Methods

Glass transition temperature (Tg, ° C.): The glass transition temperature of each of AMSAN copolymer resins was measured five times using a differential scanning calorimeter (DSC, manufactured by company TA), and an average value thereof (error range: ±0.5° C.) was calculated.

Heat deflection temperature (HDT, ° C.): The HDT of a specimen was measured according to a standard measurement method, ASTM D648.

Gloss (GU): The gloss of a specimen was measured at 45° by means of a gloss meter.

Color and whiteness (WI): The L, a, b, and whiteness index (WI) values of a specimen were measured by means of a color difference meter (Color Quest II, Hunter Lab Co.).

Here, each of L, a, and b refers to a value of a coordinate axis indicating a unique color. L, which is 0 to 100, indicates black when L is close to 0 and indicates white when L is close to 100. a, which is a positive number (+) or a negative number based on 0, indicates red when a is a positive number (+) and indicates green when a is a negative number (−). b, which is a positive number (+) or a negative number (−) based on 0, indicates yellow when b is a positive number (+) and indicates blue when b is a negative number (−).

Tensile Strength (MPa): The tensile strength of a specimen was measured at a rate of 50 mm/min according to a standard measurement method, ASTM D638.

Flexural strength (MPa): The flexural strength of a specimen was measured at a cross head rate of 15 mm/min by means of a tensile tester according to a standard measurement method, ASTM D790.

Notched Izod impact strength (kgf·cm/cm$^2$): Specimens respectively having thicknesses of ¼" and ⅛" were used, and the notched Izod impact strengths thereof were measured according to a standard measurement method, ASTM D256.

TABLE 1

| Classification | Examples | | | | | | |
|---|---|---|---|---|---|---|---|
| | 1 | 2 | 3 | 4 | 5 | 6 | 7 |
| Tg (° C.) | 129.4 | 130.1 | 131.9 | 133.5 | 135.91 | 138.52 | 132.9 |
| HDT (° C.) | 101.8 | 102.5 | 103.9 | 105.7 | 107.1 | 107.7 | 105.6 |
| Gloss | 91.3 | 92.2 | 93.1 | 93.8 | 94.5 | 96.8 | 93.8 |
| L | 69.5 | 70.7 | 72.1 | 73.3 | 74.2 | 74.9 | 73.1 |
| a | 2.14 | 1.45 | 0.63 | 0.03 | 0.04 | 0.03 | 0.05 |
| b | 19.1 | 18.4 | 18.1 | 18.0 | 17.4 | 16.5 | 18.2 |
| WI | 29.5 | 31.7 | 33.4 | 34.9 | 36.1 | 38.4 | 35.4 |
| TS | 498 | 502 | 506 | 512 | 522 | 526 | 514 |
| FS | 897 | 904 | 908 | 913 | 923 | 929 | 915 |
| IS (¼") | 15.946 | 15.177 | 14.361 | 13.913 | 12.867 | 12.154 | 13.487 |
| IS (⅛") | 17.329 | 17.297 | 17.291 | 16.202 | 15.923 | 15.147 | 16.118 |

As summarized in Table 1, it can be confirmed that, in the cases of the AMSAN copolymer resins of Examples 1 to prepared according to the present invention, superior glass transition temperature (Tg) is exhibited, and thus, resin compositions therefrom exhibit superior heat deflection temperature (HDT) and excellent gloss and whiteness (WI).

TABLE 2

| Classification | Comparative Examples | | | |
|---|---|---|---|---|
| | 1 | 2 | 3 | 4 |
| Tg (° C.) | 127.2 | 128.2 | 127.7 | 133.8 |
| HDT (° C.) | 101.1 | 101.8 | 101.2 | 105.8 |
| Gloss | 87.7 | 88.9 | 89.4 | 89.1 |
| L | 69.2 | 69.1 | 68.4 | 69.3 |
| a | 31.4 | 2.83 | 2.99 | 2.87 |
| b | 19.8 | 19.7 | 19.5 | 19.4 |
| WI | 23.7 | 27.6 | 27.8 | 28.1 |
| TS | 494 | 498 | 497 | 498 |
| FS | 896 | 892 | 894 | 895 |
| IS (¼") | 15.498 | 15.925 | 15.951 | 15.897 |
| IS (⅛") | 16.981 | 17.291 | 17.479 | 17.675 |

On the other hand, it can be confirmed that, in the cases of Comparative Example 1, in which potassium persulfate, as an initiator for reacting unreacted monomers, was added, instead of the water-soluble silicate of the present invention, to a latex and Comparative Example 2, in which an α-methyl styrene monomer was added to provide high heat resistance, glass transition temperature and heat deflection temperature were not nearly elevated and gloss and whiteness were also not improved.

In addition, it can be confirmed that, in the case of Comparative Example 3 in which coagulation was performed without addition of the water-soluble silicate of the present invention to a latex, gloss and whiteness are remarkably decreased, compared to Examples 1 to 7 according to the present invention.

In addition, it can be confirmed that, in the cases of Comparative Examples 3 (aged), and Comparative Example 4 (not aged) in which an aging process was not performed, high glass transition temperature is exhibited, but particles of coagulated latexes are too thin to apply to a molded article.

Figure 2:
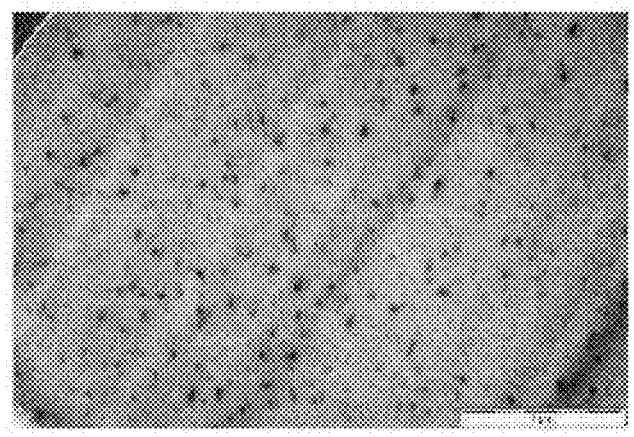
Figure 3:
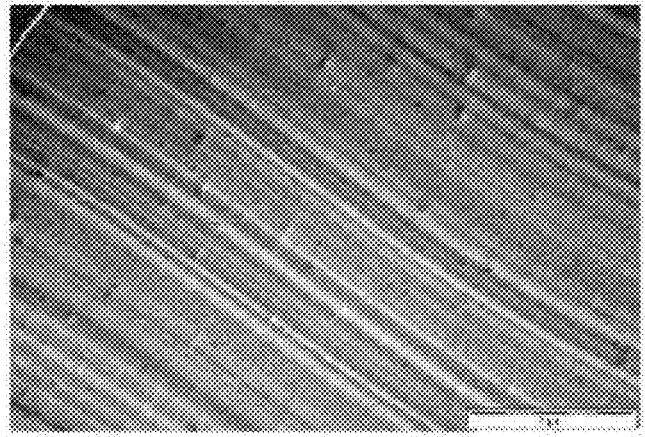

Further, referring to FIGS. 1 to 3, it can be confirmed that surfaces of the thermoplastic resin compositions (Examples 2 and 4) according to the present disclosure are smooth and glossy and look luxurious, whereas a surface of the thermoplastic resin composition (Comparative Example 3) not according to the present disclosure is rough and has low gloss and a low whiteness value, and thus, appears to be discolored.

Reference Example

An experiment was carried out in the same manner as in Example 1, except that 0.5 parts by weight of calcium silicate (CaSiO$_3$) was added instead of 0.05 parts by weight of sodium silicate (Na$_2$SiO$_3$). In this case, collected powders exhibited different heat resistance due to low dispersibility, whereby protrusions were generated during property evaluation. Accordingly, it was impossible to evaluate properties.

In conclusion, the present invention confirmed that the heat-resistant thermoplastic resin according to the present invention exhibits increased heat resistance although a metal salt coagulant is used in a small amount when a water-soluble silicate compound is added during coagulation of an α-methyl styrene-vinyl cyan compound copolymer latex with the metal salt coagulant. Accordingly, the present invention confirmed that a heat-resistant thermoplastic resin having superior heat resistance, gloss, and whiteness while having mechanical properties identical to or higher than those of a conventional thermoplastic resin and a heat-resistant thermoplastic resin composition including the heat-resistant thermoplastic resin may be realized.

The invention claimed is:

1. A thermoplastic resin composition, comprising:
a thermoplastic resin, comprising an α-methyl styrene-vinyl cyan compound copolymer and a compound represented by Formula 1 below:

$$A_o(Si_nO_{2n+1})_p \qquad \text{[Formula 1]}$$

wherein A is a divalent or trivalent metal, n is an integer of 1 to 100, and each of o and p is an integer of 1 to 5; and
a vinyl cyan compound-conjugated diene based compound-vinyl aromatic compound copolymer resin.

2. The thermoplastic resin composition according to claim 1, wherein the compound represented by Formula 1 is an in-situ compound generated by reacting a water-soluble silicate compound and a metal salt coagulant in the α-methyl styrene-vinyl cyan compound copolymer.

3. The thermoplastic resin composition according to claim 1, wherein
the compound represented by Formula 1 has a solubility in water of 0.001 to 0.1%.

4. The thermoplastic resin according to claim 1, wherein
the compound represented by Formula 1 is comprised in an amount of 0.0001 to 2 parts by weight based on 100 parts by weight of the α-methyl styrene-vinyl cyan compound copolymer.

5. The thermoplastic resin composition according to claim 2, wherein the vinyl cyan compound is one or more selected from the group consisting of acrylonitrile, methacrylonitrile, and ethacrylonitrile.

6. A thermoplastic resin
comprising an α-methyl styrene-vinyl cyan compound copolymer and a compound represented by Formula 1 below:

$$A_o(Si_nO_{2n+1})_p \qquad \text{[Formula 1]}$$

wherein A is a divalent or trivalent metal, n is an integer of 1 to 100, and each of o and p is an integer of 1 to 5,
wherein the compound represented by Formula 1 is an in-situ compound generated by reacting a water-soluble silicate compound and a metal salt coagulant in the α-methyl styrene-vinyl cyan compound copolymer, and
wherein the α-methyl styrene is comprised in an amount of 45 to 80% by weight, and the vinyl cyan compound is comprised in an amount of 15 to 50% by weight.

7. The thermoplastic resin composition according to claim 2, wherein the α-methyl styrene-vinyl cyan compound further comprises 1 to 15% by weight of an aromatic vinyl compound (except for α-methyl styrene).

8. The thermoplastic resin composition according to claim 2, wherein the water-soluble silicate compound is a linear silicate compound represented by Formula 2 below:

$$M_2(Si_nO_{2n+1}) \qquad \text{[Formula 2]}$$

wherein M is an alkali metal and n is an integer of 1 to 100.

9. The thermoplastic resin composition according to claim 2, wherein the water-soluble silicate compound is sodium silicate ($Na_2SiO_3$) or potassium silicate ($K_2SiO_3$).

10. The thermoplastic resin composition according to claim 2, wherein the water-soluble silicate compound is comprised in an amount of 0.01 to 20 parts by weight based on 100 parts by weight of the α-methyl styrene-vinyl cyan compound copolymer.

11. The thermoplastic resin composition according to claim 2, wherein the metal salt coagulant is a metal salt coagulant represented by Formula 3 below:

$$A_mX_s, \qquad \text{[Formula 3]}$$

wherein A is a divalent or trivalent metal, X is a halogen element or a sulfate ion, m is an integer of 1 to 5, and s is an integer of 1 to 5.

12. The thermoplastic resin composition according to claim 2, wherein the metal salt coagulant is one or more selected from the group consisting of calcium chloride, magnesium sulphate and aluminum sulphate.

13. The thermoplastic resin composition according to claim 2, wherein the metal salt coagulant is comprised in an amount of 0.01 to 20 parts by weight based on 100 parts by weight of the α-methyl styrene-vinyl cyan compound copolymer.

14. The thermoplastic resin composition according to claim 1, wherein the thermoplastic resin composition comprises 50 to 90% by weight of the thermoplastic resin and 10 to 50% by weight of the vinyl cyan compound-conjugated diene based compound-vinyl aromatic compound copolymer resin.

15. The thermoplastic resin composition according to claim 1, wherein the thermoplastic resin composition has a gloss of 89.5 or more.

16. The thermoplastic resin composition according to claim 1, wherein the thermoplastic resin composition has a whiteness index (WI) of 28 or more.

17. The thermoplastic resin according to claim 6, wherein the water-soluble silicate compound is a linear silicate compound represented by Formula 2 below:

$$M_2(Si_nO_{2n+1}) \qquad \text{[Formula 2]}$$

wherein M is an alkali metal and n is an integer of 1 to 100.

18. The thermoplastic resin according to claim 6, wherein the water-soluble silicate compound is sodium silicate ($Na_2SiO_3$) or potassium silicate ($K_2SiO_3$).

19. The thermoplastic resin according to claim 6, wherein the metal salt coagulant is a metal salt coagulant represented by Formula 3 below:

$$A_mX_s, \qquad \text{[Formula 3]}$$

wherein A is a divalent or trivalent metal, X is a halogen element or a sulfate ion, m is an integer of 1 to 5, and s is an integer of 1 to 5.

20. The thermoplastic resin according to claim 6, wherein the metal salt coagulant is one or more selected from the group consisting of calcium chloride, magnesium sulphate and aluminum sulphate.

* * * * *